US009509571B1

(12) United States Patent
Liu

(10) Patent No.: US 9,509,571 B1
(45) Date of Patent: Nov. 29, 2016

(54) FIRST-CLASS COMPONENT EXTENSIONS FOR MULTI-TENANT ENVIRONMENTS

(71) Applicant: NETSUITE INC., San Mateo, CA (US)

(72) Inventor: Alan S. Liu, Palo Alto, CA (US)

(73) Assignee: NetSuite Inc., San Mateo, CA (US)

( * ) Notice: Subject to any disclaimer, the term of this patent is extended or adjusted under 35 U.S.C. 154(b) by 429 days.

(21) Appl. No.: 13/943,024

(22) Filed: Jul. 16, 2013

Related U.S. Application Data

(60) Provisional application No. 61/675,723, filed on Jul. 25, 2012.

(51) Int. Cl.
*G06F 9/44* (2006.01)
*H04L 12/24* (2006.01)

(52) U.S. Cl.
CPC ..................... *H04L 41/50* (2013.01)

(58) Field of Classification Search
CPC ............... H04L 41/22; H04L 41/5054; H04L 41/0806; H04L 41/0813; H04L 41/0843; H04L 67/1097; H04L 63/00; H04L 67/10; H04L 67/02; H04L 67/42; H04L 41/50; G06F 9/5061; G06F 17/30; G06F 17/30011; G06F 9/45558; G06F 9/5072; G06F 17/30566; G06F 17/30575; G06F 2009/4557; G06F 9/44505; G06F 11/3003; G06F 17/3056; G06F 17/3089; G06F 9/541; G06F 8/35; G06F 8/60; G06F 8/65; G06F 17/30557; G06Q 10/101; G06Q 10/10; H04W 4/001
See application file for complete search history.

(56) References Cited

U.S. PATENT DOCUMENTS

| 8,255,490 | B1 * | 8/2012 | Porter | G06Q 10/06 705/25 |
| 8,291,490 | B1 * | 10/2012 | Ahmed | G06F 21/604 726/17 |
| 8,578,278 | B2 * | 11/2013 | Rauh | G06F 8/38 715/741 |
| 9,244,951 | B2 * | 1/2016 | Mandelstein | G06F 17/303 |
| 2007/0250531 | A1 * | 10/2007 | Wiggins | G06F 17/30011 |
| 2008/0256607 | A1 * | 10/2008 | Janedittakarn | H04L 63/08 726/4 |
| 2009/0271607 | A1 * | 10/2009 | Karve | G06F 9/5011 713/100 |
| 2010/0005443 | A1 * | 1/2010 | Kwok | G06Q 10/10 717/100 |
| 2010/0299663 | A1 * | 11/2010 | Weissman | G06F 8/71 717/170 |
| 2011/0010394 | A1 * | 1/2011 | Carew | G06F 17/30525 707/793 |
| 2011/0276892 | A1 * | 11/2011 | Jensen-Horne | G06F 9/5061 715/744 |
| 2011/0289479 | A1 * | 11/2011 | Pletter | G06F 17/30575 717/122 |
| 2012/0030168 | A1 * | 2/2012 | Weissenberger | G06Q 10/00 707/611 |
| 2012/0102484 | A1 * | 4/2012 | Hopmann | H04L 63/105 717/176 |
| 2012/0173589 | A1 * | 7/2012 | Kwon | G06F 17/30575 707/803 |
| 2013/0238785 | A1 * | 9/2013 | Hawk | G06F 9/5072 709/224 |
| 2013/0290690 | A1 * | 10/2013 | Nucci | G06F 17/30126 713/1 |

* cited by examiner

*Primary Examiner* — Kevin Bates
*Assistant Examiner* — Ranjan Pant
(74) *Attorney, Agent, or Firm* — Lane Powell PC

(57) ABSTRACT

A system, apparatuses, and methods for enabling management of customizations/extensions to the functionality of a multi-tenant computing platform. In some embodiments, an extended or customized entity, such as a function, operation, process, module, sub-routine, data item, etc. is represented as a record. That record is then associated with an underlying record by means of a tenant specific mapping or equivalent structure. This enables the tenant to utilize the extended or customized entity in place of the underlying record in situations in which the underlying record would typically be used. This also provides a way of isolating the extensions or customizations on the multi-tenant platform so that they are associated with specific tenants and not with other tenants who may still access the underlying or un-extended versions of the entity.

20 Claims, 8 Drawing Sheets

FIRST-CLASS COMPONENT EXTENSIONS FOR MULTI-TENANT ENVIRONMENTS

CROSS REFERENCE TO RELATED APPLICATION

This application claims the benefit of U.S. Provisional Application No. 61/675,723, entitled "First-Class Component Extensions For Multi-Tenant Environments," filed Jul. 25, 2012, which is incorporated by reference in its entirety herein for all purposes.

BACKGROUND

In addition to the advantages related to customer access that are provided by the Internet, the ability of business users to access crucial business information has been greatly enhanced by the use of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a goal of streamlining business processes and increasing efficiencies on a business-wide level. By way of example, the capabilities or modules of an ERP system may include one or more of: accounting, order processing, time and billing, inventory management, employee management/payroll, and employee calendaring and collaboration, as well as reporting and analysis capabilities relating to these functions.

Substantial efforts have also been directed to integrated Customer Relationship Management (CRM) systems, with a goal of obtaining a better understanding of customers, enhancing service to existing customers, and acquiring new, profitable customers. By way of example, the capabilities or modules of a CRM system may include one or more of: sales force automation (SFA), marketing automation, contact list management, call center support, and web-based customer support, as well as reporting and analysis capabilities relating to these functions. With differing levels of overlap with ERP/CRM initiatives and with each other, efforts have also been directed toward development of increasingly integrated partner and vendor management systems, eCommerce platforms, product lifecycle management (PLM) systems, and supply chain management (SCM) systems.

One computing and/or data processing architecture that may be used to enable user access to ERP, CRM, and other business information systems is a cloud-based platform or network. Such a platform or network is typically comprised of multiple servers that are capable of running one or more business related applications. Some cloud-based service platforms are multi-tenant, meaning that they are capable of providing access to one or more business related applications (and the associated data) by more than one business entity or sets of users. The service platform may thus provide a system or suite of functionality that is used by the tenants to provide benefits to their respective users (which may be employees of a tenant, customers of a tenant, etc.). For example, the tenants may include business enterprises that use the service platform to provide various business functions to their employees and/or customers.

In an effort to permit tenants to access the services and functionality that they desire (which may include providing certain services to their end customers, such as an eCommerce platform), a multi-tenant service platform may permit a tenant to configure certain aspects of the available service(s) to better suit their business needs. In this way the service platform may be customizable, and thereby enable a tenant to configure the platform to provide distinctive services to their respective users or to groups of those users. For example, a business enterprise that uses the service platform may want to provide specific functions or capabilities to their employees and/or customers.

Tenant customization may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants.

However, customizations introduced into the platform architecture by different tenants may be incompatible with each other in one or more ways, and this can cause a disruption in the services provided to those or other tenants. For example, such incompatibilities can cause undesirable and/or unintended behavior in the service configurations of multiple tenants, including tenants not associated with a particular customization. Certain types of customizations may also impact the operation of the platform in general, such as by altering the manner in which data is accessed or processed. This could have a negative impact on tenants beyond just those who had introduced or accessed a particular customization or extension.

Conventional approaches to managing potential problems arising from customizations and/or extensions to multi-tenant platform functionality are inefficient, ineffective and/or have undesirable side effects or other drawbacks with respect to at least one significant use case. Generally, such approaches may be categorized as either based on manual testing procedures, or automated testing procedures. Unfortunately, both of these general approaches may suffer from significant disadvantages. For example, manual system testing procedures are impractical for anything but the most trivial number or type of extensions. This is because for enterprise scale systems, testing of multiple extensions quickly encounters a problem due to the combinatorial "explosion." For instance, with 10 extensions, there would be 90 extension pairs to be tested, 720 possible sets of three extensions, and so on. As is evident, as the number of extensions increases, manual testing quickly becomes too costly in terms of time and labor. The impracticality of implementing manual testing serves as an incentive for utilizing some form of automated testing. However, current systems do not support automatic verification of correctness, making automated testing of limited value.

As another example, an un-extended service platform may operate in a manner that acts to preserve a set of platform invariants and/or to respect a set of platform constraints (e.g., attribute value constraints). However, once certain types of extended functionality are introduced, the result may be that such invariants and/or constraints can no longer be relied upon. This can result in inefficiencies and create administrative problems for platform maintainers and developers, including 3$^{rd}$ party developers of platform extensions. It can also be the source of service malfunctions that can impact one or more tenants of the platform.

Embodiments of the invention are directed toward solving these and other problems individually and collectively.

SUMMARY

This summary is a high-level overview of various aspects of the present methods and systems for providing a solution to some of the problems posed by current approaches to the management of extendible components within a cloud-based platform, and introduces some of the concepts that are further described in the Detailed Description section below. This summary is not intended to identify key or essential features of the claimed subject matter, nor is it intended to be used to determine the scope of the claimed subject matter.

Embodiments of the invention are directed to a system, apparatuses, and methods for enabling management of customizations/extensions to the functionality of a multi-tenant computing platform. In some embodiments, an extended or customized entity, such as a function, operation, process, module, sub-routine, data item, etc. is represented as a record. That record is then associated with an underlying record by means of a tenant specific mapping or equivalent structure. The result is for the tenant to be able to utilize the extended or customized entity in place of the underlying record in situations in which the underlying record would typically be used. This provides a way of isolating the extensions or customizations on the multi-tenant platform so that they are associated with specific tenants and not with other tenants who may still access the underlying or un-extended versions of the entity. This inventive way of implementing extensions or customizations prevents unwanted interactions between different extensions, while permitting each tenant to implement modifications to components (which may include data and/or logical elements) via a mapping mechanism (e.g., the "component map" or "component registry").

Embodiments of the invention may be used as part of implementing one or more functions during the installation, registration, use, or management of extensions to the functionality of a multi-tenant computing platform. For example, an embodiment of the invention may be used for one or more of the following purposes or functions:

Static or compile time checking of extension compatibility;
Overriding standard functionality with an extension to a platform component (e.g. pluggable extensions);
Enabling conflict management of extensions that override the same functionality;
Data visibility (e.g., pass-through) of extension data for other extensions; or
Read/write access of extension data for use by other extensions.

In implementing an "extension" and in accordance with embodiments of the invention, a tenant of a multi-tenant platform may perform one or more of the following:

Define their own "records", "components", or "function modules", specific to their usage of the platform/system;
Modify the way built-in records operate, in order to suit their use case. This may include tenant specific changes, such as adding fields, replacing fields, hiding fields, changing how fields interact with other fields or records, restricting the allowable values of a field (possibly in interaction with other fields or records), etc.;
Hide built-in records in certain contexts, for instance to implement security policies or to restrict operations to classes of users; or
Interconnect the system with other systems (either one provided by a third party, or to their own systems). Where the interconnection has the effect of modifying or replacing a built-in record, embodiments of the invention may be used to address the resulting management and multi-tenant use issues.

In one embodiment, the invention is directed to a method of extending the functionality of a multi-tenant computing platform, where the method includes:

defining an extensible component interface that a proposed extension is required to be compatible with;
receiving a description of the proposed extension from a first tenant of the multi-tenant computing platform, the proposed extension representing a change to a corresponding base component;
determining if the proposed extension is compatible with the extensible component interface;
registering the proposed extension in a component registry associated with the first tenant if the proposed extension is compatible with the extensible component interface;
receiving a request from the first tenant to access the base component;
accessing the component registry associated with the first tenant;
determining that the proposed extension corresponds to the base component; and
responding to the request from the first tenant to access the base component by instead accessing the proposed extension.

In another embodiment, the invention is directed to a system for extending the functionality of a multi-tenant computing platform, where the system includes:

an element for registering components of the multi-tenant computing platform;
an element containing, for one or more tenants of the multi-tenant computing platform, an association between a component of the multi-tenant computing platform and an extension to that component;
an element for receiving a request to access a component of the multi-tenant computing platform from a tenant of the multi-tenant computing platform;
an element for determining if the tenant has associated the requested component with an extension to that component; and
an element for responding to the request received from the tenant by accessing the extension instead of the component if the tenant has associated the requested component with an extension to that component.

In yet another embodiment, the invention is directed to an apparatus for extending the functionality of a multi-tenant computing platform, where the apparatus includes:

an electronic processor configured to access a non-transitory computer readable medium and programmed to execute a set of instructions;
the set of instructions stored in the non-transitory computer readable medium, wherein when executed by the electronic processor, the set of instructions cause the apparatus to implement a process for extending the functionality of a multi-tenant computing platform by defining an extensible component interface that a proposed extension is required to be compatible with;

receiving a description of the proposed extension from a first tenant of the multi-tenant computing platform, the proposed extension representing a change to a corresponding base component;

determining if the proposed extension is compatible with the extensible component interface;

registering the proposed extension in a component registry associated with the first tenant if the proposed extension is compatible with the extensible component interface;

receiving a request from the first tenant to access the base component;

accessing the component registry associated with the first tenant;

determining that the proposed extension corresponds to the base component; and responding to the request from the first tenant to access the base component by instead accessing the proposed extension.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

Figure 1:
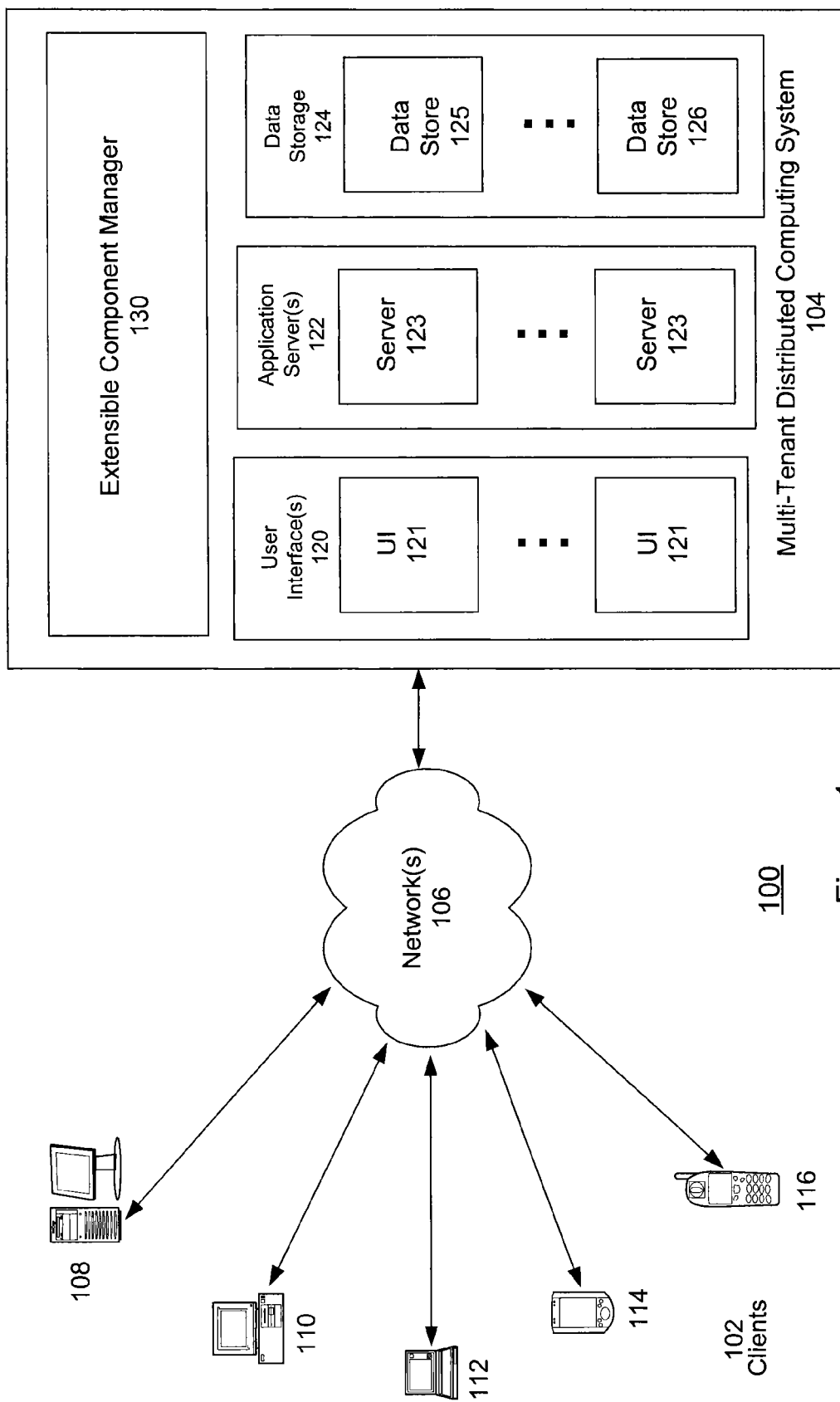
FIG. 1 is a diagram illustrating an example computing environment 100 in which an embodiment of the invention may be implemented.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied in whole or in part as a system, as one or more methods, or as one or more devices. Embodiments of the invention may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, etc.) that is programmed with a set of executable instructions (e.g., software instructions), where the instructions may be stored in a suitable data storage element. The following detailed description is, therefore, not to be taken in a limiting sense.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In accordance with at least one embodiment of the invention, a computing system, such as a multi-tenant distributed computing platform, may manage independent customizations and/or extensions (collectively, "extensions") of components of the platform by multiple tenants in a manner that avoids undesirable behavior caused by incompatible component extensions. For example, a platform component may correspond to and/or provide functionality related to one or more data objects, such as data records. The platform may require that an extended component, for example one provided by a tenant or $3^{rd}$ party vendor, be implemented in accordance with an extensibility interface. One or more such extended components may be registered with a component registry, and a tenant may select certain extended components to provide platform services to the tenant's users instead of using the corresponding un-extended or "base" components. Different tenants may select or configure different sets of extended components to provide extended platform services to their respective users, without modifying the base platform components. The extended components may be considered "first-class" in that they can take on the role or functionality of base components.

In some embodiments, an extended or customized entity, such as a function, operation, process, module, sub-routine, component, data item, etc. is represented as a record. That record is then associated with an underlying record by means of a tenant specific mapping or equivalent structure. The result is for the tenant to be able to utilize the extended or customized entity in place of the underlying record (which, as noted may be a process, component, function, module, etc.) in situations in which the underlying record would typically be used. This provides a way of isolating the extensions or customizations on the multi-tenant platform so that they are associated with specific tenants and not with other tenants who may still access the underlying or un-extended versions of the entity. This inventive way of implementing extensions or customizations prevents unwanted interactions between different extensions, while permitting each tenant to implement modifications to components (which may include data and/or logical elements) via a mapping mechanism (e.g., the "component map" or "component registry").

Embodiments of the invention may be used as part of implementing one or more functions during the installation, registration, use, or management of extensions to the functionality of a multi-tenant computing platform. For example, an embodiment of the invention may be used for one or more of the following purposes or functions:

Static or compile time checking of extension compatibility. Note that without this capability, it would not be practical (e.g., scalable) to have an extension ecosystem, where extensions from different authors are combined. Even a complex system with multiple extensions by a single author is impractical without some form of automated/automatic compatibility checking. As recognized by the inventor, this compatibility check can be achieved by defining an interface that components must follow. Detailed testing of adherence to the interface may be achieved using any suitable method or process. For example, such a method is described in U.S. patent application Ser. No. 13/865,430, entitled "System and Methods for Declaration-Based Extension Management for Multi-Tenant Environments", filed Apr. 18, 2013, assigned to the assignee of the present application, and the entire contents of which is incorporated herein for all purposes.

Overriding standard functionality with an extension to a platform component. This aspect of the present invention enables a user to customize a platform in ways not possible using current approaches. As described herein, this may be accomplished by having the platform/system access and operate a user-defined component in place of its standard "built-in" component. As also described herein, this may be accomplished by using a "registry" which defines a mapping of one or more system component(s) to their respective implementation(s). The mapping initially "points" to one or more standard or "built-in" implementations of the system components. A user defined component (such as an extension to a record, module, component, process, etc.) is then inserted into the registry in place of the standard version, and the platform/system then accesses and operates the user component(s) in place of the standard version(s).

Enabling conflict management of extensions that override the same functionality. This function is also related to the extension ecosystem mentioned previously. This feature permits multiple authors to generate extensions that can be used together or separately by different tenants. In one embodiment of the invention, instead of an approach where multiple extensions are peers, the invention imposes an ordering or hierarchy, where extension A is layered on a base component, and extension B (if it exists) is layered on extension A. This creates a chain of responsibility in terms of implementing the functionality associated with each extension. Further details regarding a process for managing potential conflicts may be found in the previously mentioned U.S. patent application Ser. No. 13/865,430, entitled "System and Methods for Declaration-Based Extension Management for Multi-Tenant Environments;

Data visibility (e.g., pass-through) of extension data for other extensions. If extension A is layered on top of extension B (where both apply to the same standard component), then it may need to refer to its "parent" standard component in a generic way. This common reference applies to both data and function access, and may be used to ensure that layering of extensions works properly; or Controlling read/write access of data associated with a first extension by other extensions. Because extensions are registered through a central component registry, an extension can use the facilities of the registry to either allow or restrict access to their data. This may include not only data access by the system (with the extension acting as an implementation of a component in the registry), but also access by other extensions. For example, consider an extension that is allowing or restricting access as extension "1". Consider a second extension as extension "2"; extension 2 is accessing the data, or being restricted from accessing the data of extension 1. Extension 2 could be a specialization of extension 1, as described herein, in which case the interaction resembles what is typically described as a "subclass/superclass" or "base-and-derived-class" relationship. Or, extensions 1 and 2 could be unrelated, in which case extension 2 would interact with extension 1 as it would interact with any component of the system. A benefit of this arrangement is that the extensions are not required to define a mechanism for providing their data to other extensions (which can rapidly become unwieldy and impractical). By requiring extensions to use the inventive component registry to mediate their interactions, and by allowing the component registry to define how these interactions occur, the overall complexity is limited, thereby facilitating maintenance of the extensions and the stability of the system.

In one embodiment, extended components may be evaluated for compatibility and/or proper implementation at the time of installation and/or registration. When extended components are implemented, at least in part, with a compiled programming language, the components may also be evaluated at the time of compilation. For example, such a check may ensure that the extended component incorporates the extensibility interface and suitably implements the elements of the extensibility interface where required. In accordance with at least one embodiment of the invention, the extensibility interface may require that the extended component implement one or more runtime validation elements. For example, the platform may require that the extended component pass validation with respect to its validation elements and/or with respect to one or more validation elements of the corresponding base component in order to remain registered and/or active in tenant service configurations.

Note that although reference is made to use of a compiled programming language for implementation of an extension or element of an extension, embodiments of the invention are not limited to this implementation. For example, an extension or element of an extension may be implemented in an interpreted language (e.g., JAVASCRIPT™) and evaluation of the extension performed through a form of static analysis (instead of during compilation). In such a case the evaluation may be with regards to one or more of installation, registration, or validation of the extension or a component of the extension.

Further, note that an "extension" in accordance with embodiments of the invention may involve a tenant of a multi-tenant platform performing one or more of the following operations, processes, tasks, etc.:

Defining their own "records", "components", or "function modules", specific to their usage of the platform/system;

Modifying the way built-in records operate, in order to suit their use case. This may include tenant specific changes, such as adding fields, replacing fields, hiding fields, changing how fields interact with other fields or records, restricting the allowable values of a field (possibly in interaction with other fields or records), etc.;

Hiding built-in records in certain contexts, for instance to implement security policies or to restrict operations to classes of users; or Interconnecting the system with other systems (either one provided by a third party, or to their own systems). Where the interconnection has the effect of modifying or replacing a built-in record, embodiments of the invention may be used to address the resulting management and multi-tenant use issues.

In one embodiment, when an extended component creates a data object, the platform may prevent access to the data object by component instances that are not of a same type as the object creator. Alternatively, or in addition, the platform may limit data object access to a level or form sufficient to enable migration of the data object from management by a base component to management by the extended component. For example, the platform may provide read-only access to non-creator instances when the extended component includes and/or registers migration functionality. Note that migration of a data object need not be associated with a change to the object structure, such as a change to the number and/or type of data object attributes. For example, an "extended" data object may be associated with a different set of invariants and/or constraints (collectively, "constraints") than the corresponding un-extended (or base) data object. Further, the extended component may include functionality directed to maintaining or implementing a new constraint. Examples of such constraints include the "NOT NULL" constraint of SQL and attribute value constraints.

FIG. 1 is a diagram illustrating an example computing environment 100 in which an embodiment of the invention may be implemented. As shown in the figure, a variety of clients 102 incorporating and/or incorporated into a variety of computing devices may communicate with a multi-tenant distributed computing system 104 through one or more networks 106. For example, a client may incorporate and/or be incorporated into a client application (e.g., software) implemented at least in part by one or more of the computing devices. Examples of suitable computing devices include personal computers, server computers 108, desktop computers 110, laptop computers 112, notebook computers, tablet computers, personal digital assistants (PDAs) 114, smart phones 116, cell phones, and consumer electronic devices incorporating one or more computing device components such as one or more processors, central processing units (CPU), or controllers. Examples of suitable networks 106 include networks utilizing wired and/or wireless communication technologies and networks operating in accordance with any suitable networking and/or communication protocol (e.g., a company intranet, the Internet, etc.).

The multi-tenant distributed computing platform/system 104 may include multiple processing tiers or layers, including a user interface layer 120, an application layer 122, and a data storage layer 124. The user interface layer 120 may maintain multiple user interfaces 121, including graphical user interfaces and/or web-based interfaces. The user interfaces may include a default user interface for the platform (e.g., an administrative UI), as well as one or more user interfaces extended by one or more tenants of the system (e.g., via access to one or more APIs). The default user interface may include components enabling tenants to provide extensions or additional functionality to system 104 and otherwise administer their participation in the functions and capabilities provided by the system. Tenants may be distinguished from other users in this way, and/or tenants may be responsible for costs incurred due to utilization of the distributed computing system 104 by tenant customers (e.g., users of the system as it has been extended by a tenant). Each tier or layer may be implemented with a set of computers and/or computer components including computer servers and processors, and may perform various functions, methods, processes, or operations as determined by the execution of a software application or set of instructions. The data storage layer 124 may include one or more production data stores 125 and one or more testing, validation and/or backup data stores 126. Data stores may be implemented with any suitable data storage technology including structured query language (SQL) based relational database management systems (RDBMS).

In accordance with at least one embodiment of the invention, the distributed computing system 104 may be multi-tenant, and may include an ability for a tenant to extend the functionality and/or operation of one or more components of a common service platform. As noted, this capability may result in inter-tenant extension incompatibilities if not effectively managed. To provide a suitable management function, distributed computing system 104 may include an extensible component manager 130 configured at least to manage and/or administer extensible platform components. For example, tenants may interact with the extensible component manager 130 through one or more of the user interfaces 121. An example extensible component manager in accordance with at least one embodiment of the invention is described in more detail below with reference to FIGS. 3 and 4. However, before providing these details, further information is provided with respect to distributed computing systems or platforms and extensibility interfaces, in accordance with at least one embodiment of the invention.

Figure 2:
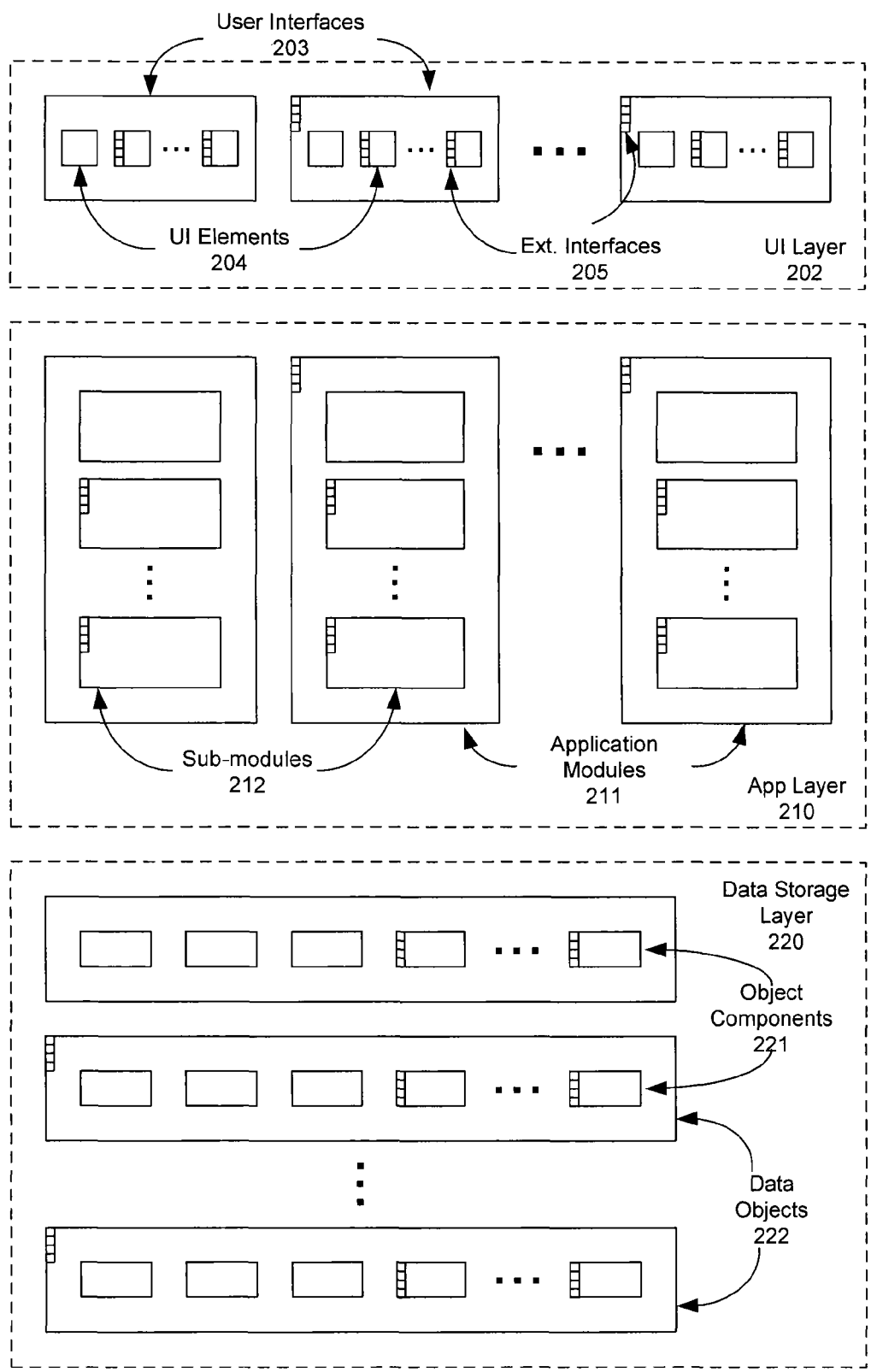
FIG. 2 is a diagram further illustrating elements or components that may be part of a multi-tenant distributed computing system architecture 200, in accordance with at least one embodiment of the invention.

FIG. 2 is a diagram further illustrating elements or components that may be part of a multi-tenant distributed computing system architecture 200, in accordance with at least one embodiment of the invention. In at least one embodiment, system architecture 200 may represent an implementation of some aspects of computing system 104 of FIG. 1. The example architecture 200 includes a user interface layer or tier 202 having one or more user interfaces 203. Examples of such user interfaces include graphical user interfaces and application programming interfaces (APIs). Each user interface may include one or more interface elements 204. Users may interact with such interface elements in order to access functionality and/or data provided by application 210 and/or data storage 220 layers of the example architecture. Examples of suitable graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces (API) may be local or remote, and may include interface elements such as parameterized procedure calls, programmatic objects, and messaging protocols. In one embodiment, proposed system/platform extensions may extend the user interface layer by adding a new user interface, removing or replacing an existing user interface, and/or extending or altering an existing user interface. An existing user interface may be extended or altered by adding new interface elements, replacing interface elements, and/or altering/extending user interface elements (such as by altering the previous functionality, display, action, or purpose of such elements).

Note that it need not be the case that each component of the system/platform is extensible. As an example, in FIG. 2, extensible components are indicated with an icon (e.g., extendible interfaces/elements 205). For example, extensible components may implement an extensibility interface in accordance with at least one embodiment of the invention (e.g., as described below in greater detail with reference to FIG. 3) and/or incorporate a corresponding extensibility data structure. As shown in FIG. 2, a user interface may be extensible (as suggested by element 205) without each of its elements being extensible, and vice versa.

The application layer 210 may include one or more application modules 211, each having one or more sub-modules 212. The application modules and/or sub-modules may include any suitable computer-executable code or set of instructions (e.g., as would be executed by a suitably programmed processor or CPU), such as computer-executable code corresponding to a programming language. For example, programming language source code may be compiled into computer-executable code. Alternatively, or in addition, the programming language may be an interpreted programming language, such as a scripting language. Each application server (e.g., element 123 of FIG. 1) may include each application module 211. Alternatively, different application servers may include different sets or groups of application modules. Such sets may be disjoint or overlapping. In one embodiment, proposed system/platform extensions may extend the application layer by adding new application modules, removing or replacing existing application modules, and/or extending or altering the functionality of existing application modules. An existing application module may be extended or altered by adding new sub-modules, removing or replacing existing sub-modules and/or altering/extending the functionality of existing sub-modules. Extensible components of the service platform may include suitable application modules and/or sub-modules. As shown in FIG. 2, an application module may be extensible without each of its sub-modules being extensible, and vice versa.

The data storage layer 220 may include one or more data objects 222, each having one or more data object components 221 (e.g., attributes, characteristics, and/or behaviors). For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer (e.g., element 125 or 126 of FIG. 1) may include each data object. Alternatively, different data stores may include different sets or groups of data objects. Such sets may be disjoint or overlapping. In one embodiment, proposed system/platform extensions may extend the data storage layer by adding new data objects, removing or replacing existing data objects, and/or extending or altering existing data objects. Existing data objects may be extended or altered by adding new data object components, removing or replacing existing data object components, and/or altering/extending existing data object components. Extensible components of the service platform may include suitable data objects and/or data object components. As shown in FIG. 2, a data object may be extensible without each of its components being extensible, and vice versa.

Note that the computing environment 100 depicted in FIG. 1 is not intended to be a limiting example. Alternatively, or in addition, computing environments in which an embodiment of the invention may be implemented include any suitable system that permits installation of a module that modifies a default behavior (e.g., an extension). Examples of suitable systems include modifiable hardware systems, computing systems incorporating firmware or re-configurable processors, and stand-alone or local-only software systems or applications. Although further examples may reference the computing environment(s) depicted in FIG. 1 or FIG. 2, it will be apparent to one of skill in the art that the examples may be adapted for alternate computing devices, systems, architectures, and environments.

In at least one embodiment, when a tenant activates an extended component, service requests from the tenant's users may be routed to the extended component for fulfillment of the request, rather than to the "base" (un-extended) component. However, the base component remains available (unchanged) as part of the system/platform, and its functionality is available, including to the extended component. For example, the extended component may provide functionality and/or attributes that are an addition to, or that build upon the functionality and/or attributes of the base component (e.g., the extensions in some way depend upon or reference aspects of the base component). In accordance with at least one embodiment of the invention, the system/platform may require that an extended component implement an extensibility interface, such as that which will be described with reference to FIG. 3.

Figure 3:
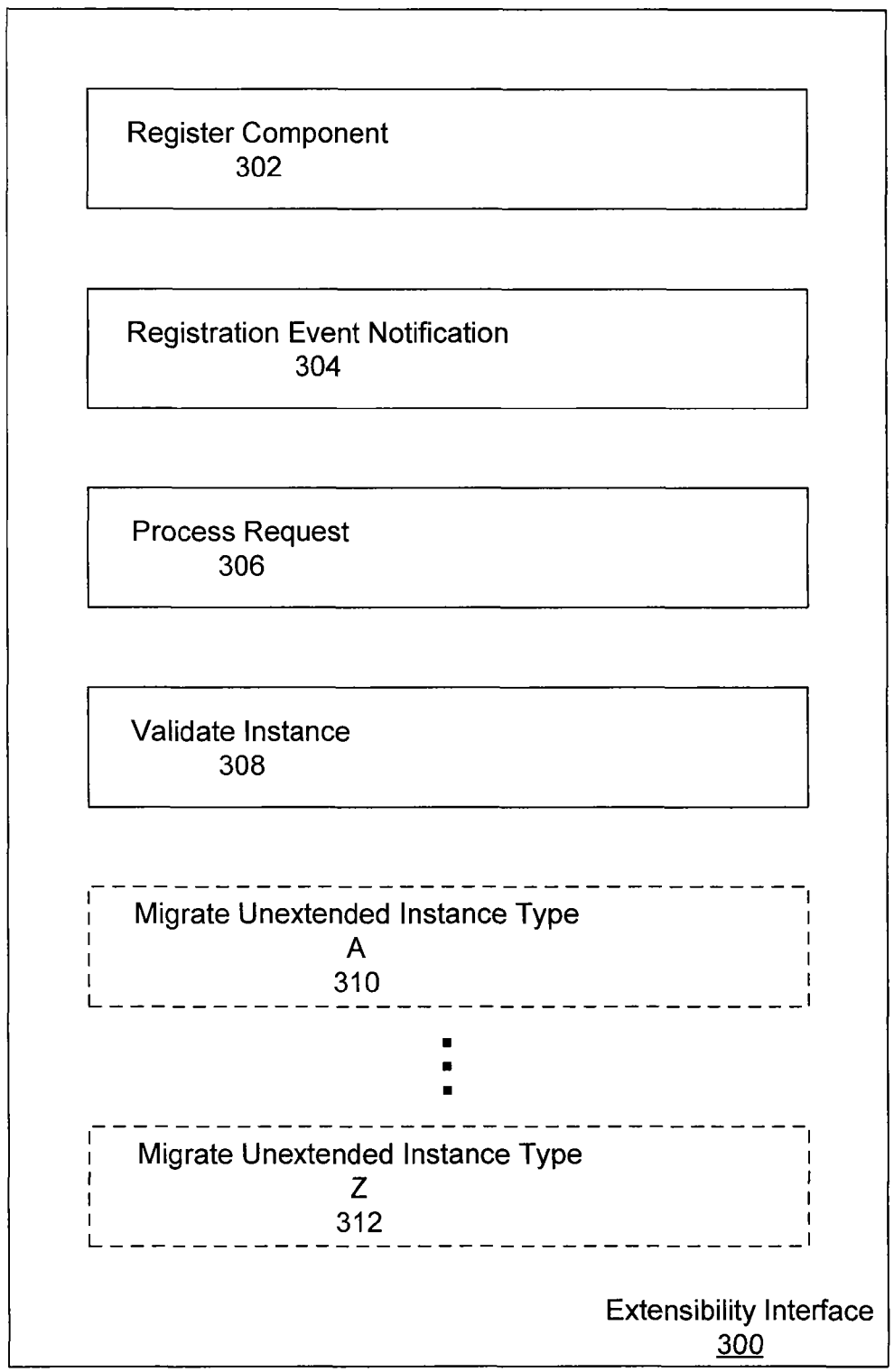
FIG. 3 is a diagram illustrating elements of an example extensibility interface 300 which may be implemented in accordance with at least one embodiment of the invention.

FIG. 3 is a diagram illustrating elements of an example extensibility interface 300 which may be implemented in accordance with at least one embodiment of the invention. The extensibility interface 300 is an example of an application programming interface (API), as described with reference to FIG. 2. As such, the interface elements may correspond to parameterized procedure calls, programmatic objects including data structures, and/or messaging protocols. The extensibility interface 300 may enable the extensible component manager 130 of FIG. 1 to manage an extended component that implements the interface and/or provides a mechanism for interacting with the interface. Both base components and extended components may implement the extensibility interface, and an extended component may serve as a base component with respect to another extended component. The extensibility interface 300 may include a register component element 302 configured at least to register an extended component with the extensible component manager. For example, registration may include associating the extended component with an extended component identifier (e.g., name) and a base component that is extended by the extended component. A registration event notification element 304 of the extensibility interface 300 may enable the extended component and/or its instances to receive notification from the extensible component manager. For example, the extensible component manager may notify an extended component that its registration was successful, and in response the extended component may perform one or more post-registration initialization processes. Further examples of possible notifications include notification of selection for active use by a tenant, notification of removal from active use, and notification of deregistration. A process request element 306 of the extensibility interface 300 may enable the extensible component manager to pass a request to the extended component for processing.

The extensibility interface 300 may further include a "validate instance" element 308. The extended component may implement the validate instance element to validate or otherwise evaluate a state of the extended component and/or one or more data objects maintained (and/or updated) by the extended component. For example, the extensible component manager may activate the validate instance element after a particular instance of an extended component indicates that it has finished processing a request that the extensible component manager provided to the instance.

Note that as is conventional in the art, the term "instance" is used here in the programmatic sense of "object instance." Active or runtime components in accordance with at least one embodiment of the invention may have a single instance, a fixed number of instances, or a variable number of instances, with each associated with a distinct state and/or set of computation resources, such as data storage and/or a thread of execution. The extensible component manager may relay requests to particular instances, and activate the validate instance element 308 of the extensibility interface 300 with respect to the particular instances.

In accordance with at least one embodiment of the invention, access to component instances, including data object instances such as records, is restricted to the component type that created the component instance. For example, a base component, a first extension of the base component, and a second extension of the base component may each be considered separate component types for this purpose. The extensibility interface may require that each component instance reference the component type that created the instance (e.g., a copy of the registered name or identifier of the component type). To enable new extended components to access old instance data, the extensibility interface may include one or more migration elements (depicted as "Migrate Unextended Instance Type A 310 . . . Migrate Unextended Instance Type Z 312" in the figure). For example, the migration elements may have access to old instance data that enables the new extended component to take ownership of, move, and/or copy the old instance data to create new instances associated with the new extended component. As shown in FIG. 3, the extensibility interface may include multiple such migration elements corresponding to different component types (i.e., elements 310 through 312 in the figure). The dashed line surrounding elements 310 through 312 in FIG. 3 is intended to suggest that the migration elements may be optional and/or dynamically added (e.g., via re-registration). In accordance with at least one embodiment of the invention, extended components in accordance with the extensibility interface may be stored in rows of a table of an RDBMS having a schema that includes fields such as "component name," "component id," and a mapping to component attributes and/or fields (e.g., via a mapping table).

Figure 4:
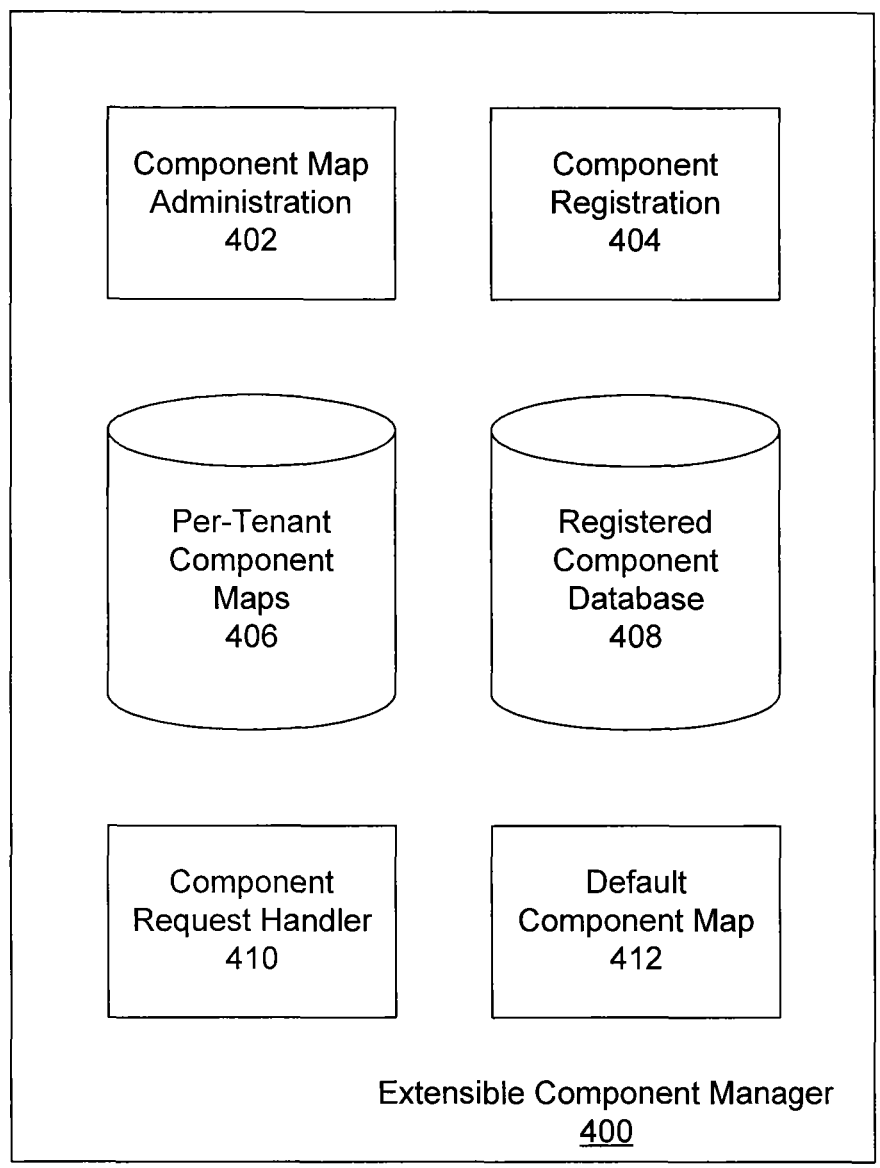
FIG. 4 is a diagram illustrating elements of an example extensible component manager 400 in accordance with at least one embodiment of the invention.

FIG. 4 is a diagram illustrating elements of an example extensible component manager 400 in accordance with at least one embodiment of the invention. Note that in one embodiment, the functions, operations, processes, or methods described with reference to the elements/modules of extensible component manager 400 may be performed as a result of the execution of a set of software instructions (e.g., code) by a suitably programmed processing element (such as a data processor, microprocessor, controller, CPU, etc.).

In general, the inventive extensible component manager and its associated elements and methods treat entities (e.g., pieces of information) in the system as records. These entities include both built-in records, and records defined by extensions. In some cases an extension may define a new type of record. In others, the extension may define an extension and declare that it should represent or take the place of a built-in (or standard) record type. To implement this capability, the invention defines both a record type and a record type implementation. Initially, these may be related by a one-to-one correspondence. For example, a record type "Customer" may be represented by the built-in "Customer Implementation Type". Now an extension implements its own modified version of the customer type, and it may be referred to as "Extension #1 Customer Implementation Type". In this situation there now needs to be a mapping or association between record types and the implementation(s) selected by a user. In accordance with embodiments of the invention, this mapping is itself a record, with its own implementation. Hence, FIG. 4 depicts both a map, and a per-tenant map which can contain information associating a tenant's desired implementation of a function or record with a default or baseline implementation. Note that the default component map is understood to be the built-in implementation of the component map before extension by a tenant.

Use of the inventive record-based approach to extended platform functionality in a multi-tenant system enables a partitioning of the behavior of different extensions. In order to isolate possibly unwanted interactions between different extensions, execution separation can be enforced using the inventive mapping mechanism (e.g., a "component map" or "component registry").

The extensible component manager 400 may include a component registration module 404 configured at least to register extended components and make them available for tenant selection and activation. Note that base components may also be registered with the component registration module. Component registrations may be stored in the registered component database 408. The extensible component manager 400 may further include a component map administration module 402 configured at least to enable a tenant to modify a default component map 412 of platform functionality to base component(s), so that the tenant-specific map 406 instead references one or more extended components. Each extensible base component may be associated with a named (or otherwise identified) request that may be mapped to an extended component. A component request handler 410 may intercept each such request, associate the request with a particular tenant, and route the request in accordance with the tenant's component map 406. The component request handler 410 may also handle run-time validation, for example, by invoking the validate instance element of the extensibility interface of the component instance that processed the request. In accordance with at least one embodiment of the invention, the extensible component manager 400 is itself an extensible component of the service. Accordingly, requests for functionality not fully supported by any base component may be routed to an added component.

Figure 5:
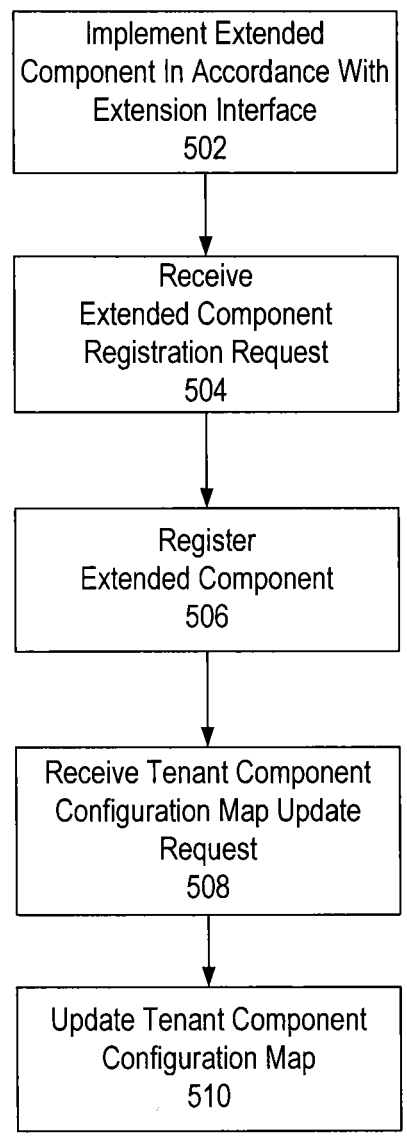
FIG. 5 is a flowchart or flow diagram illustrating steps that may be part of an exemplary process for management of extensible component(s) in accordance with at least one embodiment of the invention.

FIG. 5 is a flowchart or flow diagram illustrating steps that may be part of an exemplary process for management of extensible component(s) in accordance with at least one embodiment of the invention. In one embodiment, the steps or stages illustrated in the figure may be performed by the extensible component manager depicted in FIG. 1 and FIG. 4. In such a case, the steps or stages may be performed as a result of a suitably programmed processor, CPU, controller, or microprocessor executing a set of instructions or software code.

As shown in the figure, a new extended component may be implemented in accordance with the extension interface 502 (an example of which is described with reference to FIG. 3). For example, a tenant and/or $3^{rd}$ party vendor may extend a base component to modify the behavior of the base component and, as part of implementing the new extended component, may implement the elements of the extensibility interface of FIG. 3. In accordance with at least one embodiment of the invention, one or more of the elements of the extensibility interface may have a default implementation that may be utilized by an extended component developer.

A request to register the new extended component may be received, as indicated at step 504. For example, the component registration module of FIG. 4 may receive the registration request in response to activation of the register component element of the extensibility interface (element 302 of FIG. 3). Authorized tenants and/or $3^{rd}$ party vendors may install extended components, for example, by interacting with a service UI explicitly for that purpose. In one embodiment, it may be the case that the request to register the new extended component cannot be generated unless the component is implemented in accordance with the extensibility interface. Alternatively, the component registration module may explicitly check that the new extended component is in compliance with the extensibility interface, and refuse to register the component if it is not. As part of the registration/installation 506, or at a later time, a request may be received to update a tenant component configuration map 508, such as the component maps described with reference to FIG. 4 (i.e., element 406 of FIG. 4), followed by performing an update to that map 510. The service may include an explicit UI for administering a tenant's component map.

Figure 6:
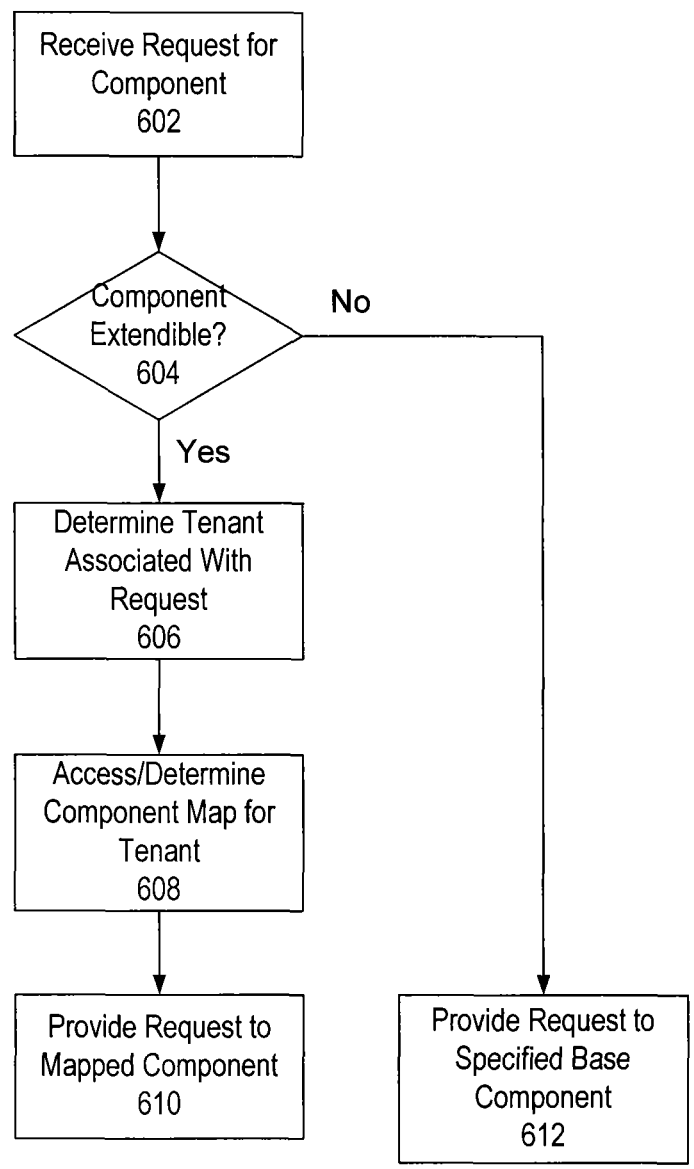
FIGS. 6 and 7 are flowcharts or flow diagrams illustrating steps that may be part of an exemplary process for service functionality request handling in accordance with at least one embodiment of the invention.
Figure 7:
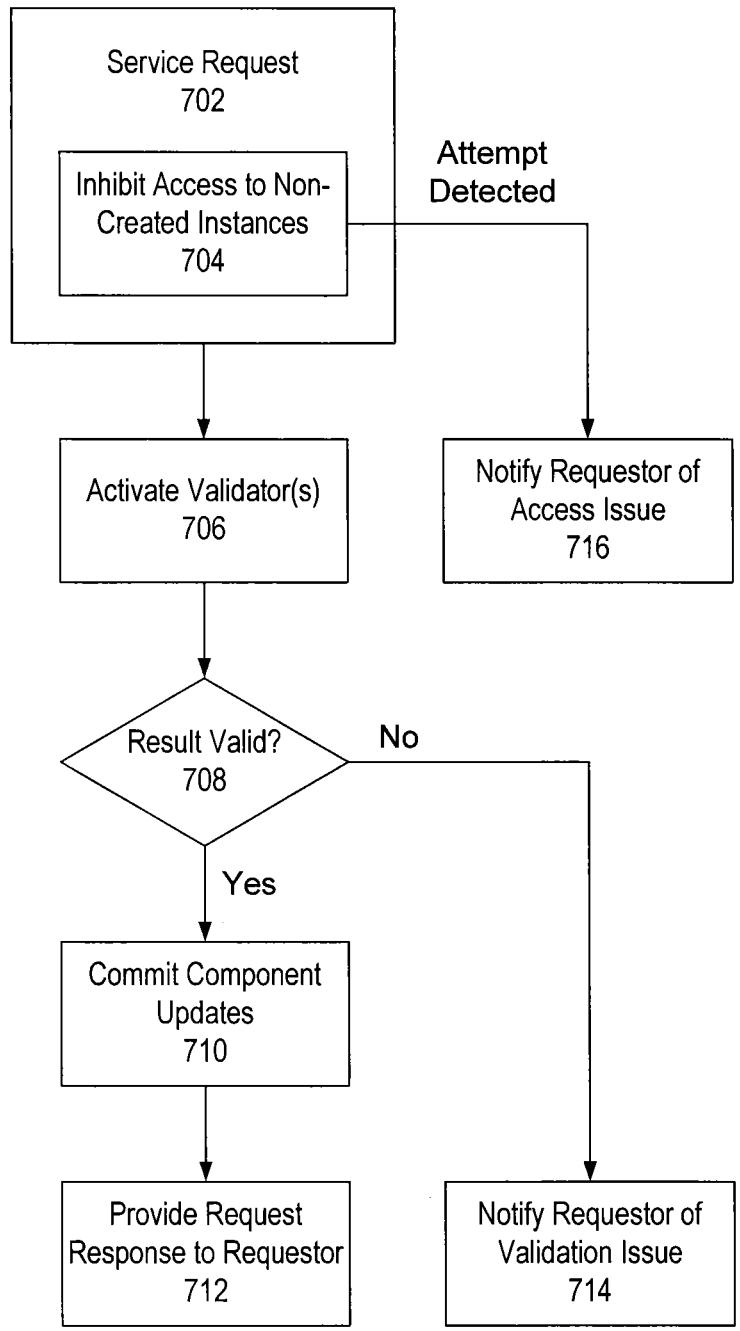

FIGS. 6 and 7 are flowcharts or flow diagrams illustrating steps that may be part of an exemplary process for service functionality request handling in accordance with at least one embodiment of the invention. The steps or stages may be performed as a result of a suitably programmed processor, controller, or microprocessor executing a set of instructions or software code. As shown in FIG. 6, a request for functionality associated with a particular component may be received 602, for example, by the component request handler 410 of FIG. 4. The component request handler may determine whether the request is associated with an extensible component 604. If not, the handler may pass the request to the associated base component 612. Otherwise, a tenant associated with the request may be determined 606. For example, the request may originate with a service user that is associated with a particular tenant and/or the request may originate with a particular UI or other component that is associated with a particular tenant. The component map associated with the tenant may be obtained 608, for example, from the component maps database, and the request may be routed to the component (base or extended) specified by the map 610. For example, the component request handler may activate the process request element of the extensibility interface of the mapped component.

Referring to FIG. 7, the receiving component may service the request 702. In accordance with at least one embodiment of the invention, access to non-created component instances, including non-created data objects, may be inhibited by the service 704. This inhibition may enhance reliability of the extensible service. In one embodiment, it may cause request servicing to terminate, and generation of a notification of the inhibited access to be sent to the request originator 716. Once the request has been serviced, one or more validators may be activated 706. For example, the component request handler may activate the validate instance element (element 308 of FIG. 3) of the extensibility interface of the component that serviced the request. When that component is an extended component, the extended component may activate the validate instance interface element of its base component (and so on, if the base component is also an extended component). If the validation is successful (as indicated by the "Yes" branch of step 708), then any instance updates may be committed to the data store 710, and the request response routed to the request originator 712. Otherwise (as indicated by the "No" branch of step 708), the updates are not committed, and the request originator is notified of the validation issue 714. Alternatively, or in addition, the component request handler may remove the extended component from consideration as being "active". For example, this may be accomplished by updating tenant maps that reference the extended component.

In accordance with at least one embodiment of the invention, multiple component extensions may be registered by multiple tenants of a distributed computing system. Interactions with interfaces of the registered components may be intercepted. One of the registered extensions may be identified for handling a particular request based at least in part on a tenant associated with the request. The request may be routed to the identified component. Should it be detected that the handling of the request by the extended component is invalid, then the extended component may be disabled or otherwise rendered inactive. In accordance with at least one embodiment of the invention, the handling of the request is valid when the handling result is validated by the extended component and by its base component (recursively). In accordance with at least one embodiment of the invention, extended components may enforce additional constraints but may not relax constraints enforced by a base component.

Figure 8:
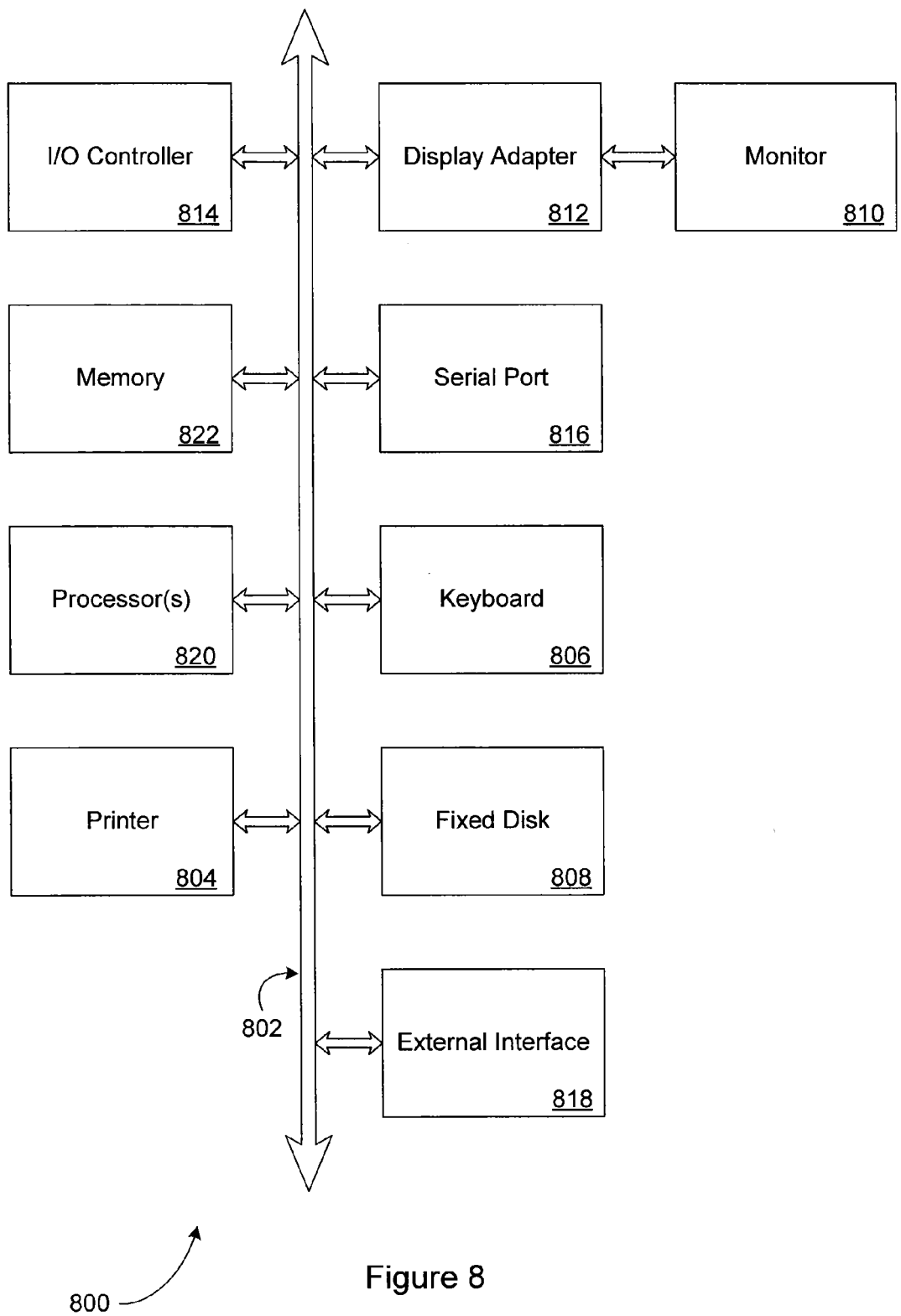
FIG. 8 is a diagram illustrating elements that may be present in a computer device and/or system 800 configured to implement a method, operation, function, and/or process in accordance with some embodiments of the present invention.

In accordance with at least one embodiment of the invention, one or more aspects, elements, or components of inventive the system, apparatus, methods, functions, processes, and/or operations for extensible component registration and management may be wholly or partially implemented in the form of a set of instructions executed by one or more programmed computer processors such as a central processing unit (CPU), controller, server, or microprocessor. Such a processor may be incorporated in an apparatus, server, client or other computing device operated by, or in communication with, other components of the system. As an example, FIG. 8 is a diagram illustrating elements that may be present in a computer device and/or system 800 configured to implement a method, operation, function, and/or process in accordance with some embodiments of the present invention. The subsystems shown in FIG. 8 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to further devices and/or systems not shown in FIG. 8 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes, data processing operations, methods, or functions described in this application may be implemented as software code to be executed by a suitably programmed processor using any suitable computer language such as, for example, JAVA™, C++ or PERL™ using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method of extending the functionality of a multi-tenant computing platform, comprising:
   defining an extensible component interface that a proposed extension is required to be compatible with;
   receiving a description of the proposed extension from a first tenant of the multi-tenant computing platform, the proposed extension representing a change to a corresponding base component;
   determining if the proposed extension is compatible with the extensible component interface;
   registering the proposed extension in a component registry associated with the first tenant if the proposed extension is compatible with the extensible component interface;
   receiving a request from the first tenant to access the base component;
   accessing the component registry associated with the first tenant;
   determining that the proposed extension corresponds to the base component; and
   responding to the request from the first tenant to access the base component by instead accessing the proposed extension.

2. The method of claim 1, wherein determining if the proposed extension is compatible with the extensible component interface further comprises determining the compatibility while compiling the proposed extension.

3. The method of claim 1, wherein determining if the proposed extension is compatible with the extensible component interface further comprises determining the compatibility using a static method.

4. The method of claim 1, wherein the base component is one of a data object, a user interface object, an application, a process, a method, an operation, a function, a file, or a record.

5. The method of claim 1, wherein the component registry associated with the first tenant includes a mapping between the base component and the proposed extension.

6. The method of claim 1, further comprising:
   receiving a description of a proposed extension from a second tenant of the multi-tenant computing platform, the proposed extension representing a change to a corresponding base component;
   determining if the proposed extension received from the second tenant is compatible with the extensible component interface;
   registering the proposed extension received from the second tenant in a component registry associated with the second tenant if the proposed extension is compatible with the extensible component interface;
   receiving a request from the second tenant to access the base component to which the proposed extension received from the second tenant corresponds;
   accessing the component registry associated with the second tenant;
   determining that the proposed extension received from the second tenant corresponds to the base component; and
   responding to the request from the second tenant to access the base component to which the proposed extension received from the second tenant corresponds by instead accessing the proposed extension received from the second tenant.

7. The method of claim 6, wherein the base component to which the proposed extension received from the first tenant corresponds and the base component to which the proposed extension received from the second tenant corresponds are the same base component.

8. The method of claim 6, wherein the first tenant and the second tenant are the same tenant.

9. The method of claim 6, wherein the base component to which the proposed extension received from the second tenant corresponds is one of a data object, a user interface object, an application, a process, a method, an operation, a function, a file, or a record.

10. The method of claim 1, wherein the base component is an extension of another component.

11. A system for extending the functionality of a multi-tenant computing platform, comprising:
   an element for registering components of the multi-tenant computing platform;
   an element containing, for one or more tenants of the multi-tenant computing platform, an association between a component of the multi-tenant computing platform and an extension to that component;
   an element for receiving a request to access a component of the multi-tenant computing platform from a tenant of the multi-tenant computing platform;
   an element for determining if the tenant has associated the requested component with an extension to that component; and
   an element for responding to the request received from the tenant by accessing the extension instead of the component if the tenant has associated the requested component with an extension to that component.

12. The system of claim 11, wherein the element containing an association between a component of the multi-tenant computing platform and an extension to that component is a data file that includes a mapping between the component and the extension.

13. The system of claim 11, wherein the components of the multi-tenant computing platform include one or more of a data object, a user interface object, an application, a process, a method, an operation, a function, a file, or a record.

14. An apparatus for extending the functionality of a multi-tenant computing platform, comprising:
   an electronic processor configured to access a non-transitory computer readable medium and programmed to execute a set of instructions;
   the set of instructions stored in the non-transitory computer readable medium, wherein when executed by the electronic processor, the set of instructions cause the apparatus to implement a process for extending the functionality of a multi-tenant computing platform by
      defining an extensible component interface that a proposed extension is required to be compatible with;
      receiving a description of the proposed extension from a first tenant of the multi-tenant computing platform, the proposed extension representing a change to a corresponding base component;
      determining if the proposed extension is compatible with the extensible component interface;
      registering the proposed extension in a component registry associated with the first tenant if the proposed extension is compatible with the extensible component interface;
      receiving a request from the first tenant to access the base component;
      accessing the component registry associated with the first tenant;
      determining that the proposed extension corresponds to the base component; and
      responding to the request from the first tenant to access the base component by instead accessing the proposed extension.

15. The apparatus of claim 14, wherein the base component is one of a data object, a user interface object, an application, a process, a method, an operation, a function, a file, or a record.

16. The apparatus of claim 14, wherein the component registry associated with the first tenant includes a mapping between the base component and the proposed extension.

17. The apparatus of claim 14, wherein the set of instructions further comprise instructions which when executed by the electronic processor cause the apparatus to implement a process for
   receiving a description of a proposed extension from a second tenant of the multi-tenant computing platform, the proposed extension representing a change to a corresponding base component;
   determining if the proposed extension received from the second tenant is compatible with the extensible component interface;
   registering the proposed extension received from the second tenant in a component registry associated with the second tenant if the proposed extension is compatible with the extensible component interface;
   receiving a request from the second tenant to access the base component to which the proposed extension received from the second tenant corresponds;
   accessing the component registry associated with the second tenant;
   determining that the proposed extension received from the second tenant corresponds to the base component; and
   responding to the request from the second tenant to access the base component to which the proposed extension received from the second tenant corresponds by instead accessing the proposed extension received from the second tenant.

18. The apparatus of claim 17, wherein the base component to which the proposed extension received from the first tenant corresponds and the base component to which the proposed extension received from the second tenant corresponds are the same base component.

19. The apparatus of claim 17, wherein the first tenant and the second tenant are the same tenant.

20. The apparatus of claim 14, wherein the base component is an extension of another component.

* * * * *